US011884038B2

(12) United States Patent
Schalk

(10) Patent No.: US 11,884,038 B2
(45) Date of Patent: Jan. 30, 2024

(54) APPARATUS FOR MANUFACTURING A PACKAGING PRODUCT, AND KIT FOR FORMING AN APPARATUS

(71) Applicant: Sprick GmbH Bielefelder Papier- und Wellpappenwerke & Co., Bielefeld (DE)

(72) Inventor: Bastian Schalk, Detmold (DE)

(73) Assignee: Sprick GmbH Bielefelder Papier-Und Wellpappenwerke & Co., Bielefeld (DE)

( * ) Notice: Subject to any disclaimer, the term of this patent is extended or adjusted under 35 U.S.C. 154(b) by 192 days.

(21) Appl. No.: 17/431,874

(22) PCT Filed: Feb. 18, 2020

(86) PCT No.: PCT/EP2020/054204
§ 371 (c)(1),
(2) Date: Aug. 18, 2021

(87) PCT Pub. No.: WO2020/169580
PCT Pub. Date: Aug. 27, 2020

(65) Prior Publication Data
US 2022/0143947 A1 May 12, 2022

(30) Foreign Application Priority Data
Feb. 18, 2019 (DE) .................... 10 2019 001 185.6

(51) Int. Cl.
*B31D 5/00* (2017.01)

(52) U.S. Cl.
CPC .... *B31D 5/0052* (2013.01); *B31D 2205/0023* (2013.01); *B31D 2205/0047* (2013.01);
(Continued)

(58) Field of Classification Search
CPC ........................... B31D 5/0047; B31D 5/0052
See application file for complete search history.

(56) References Cited

U.S. PATENT DOCUMENTS 4,355,437 A * 10/1982 Wright .................. A22C 13/02
452/29
4,884,999 A * 12/1989 Baldacci ............. B31D 5/0047
493/967

(Continued)

FOREIGN PATENT DOCUMENTS

DE 102012218679 A1 4/2014
DE 102016114342 A1 2/2018

(Continued)

OTHER PUBLICATIONS

International Search Report dated Jun. 5, 2020, Application No. PCT/EP2020/054204, with English language translation.

(Continued)

*Primary Examiner* — Praachi M Pathak
(74) *Attorney, Agent, or Firm* — Banner & Witcoff Ltd.

(57) ABSTRACT

An apparatus for manufacturing a packaging product from a packaging-material web may include a production device for making the packaging-material web; a drawing device for drawing the packaging-material web off from a packaging-material source; a deforming device for deforming the packaging-material web; a removal conveying device for removing the packaging-material product from the apparatus; and/or a dispensing device for dispensing the packaging-material product in an aligned manner; and using a module interface, via which at least one of the functional units, forming a structural unit, can be connected in a releasable manner to an adjacent functional unit upwards and/or downwards in the conveying direction and/or changed over therewith.

20 Claims, 4 Drawing Sheets

Figure 1:
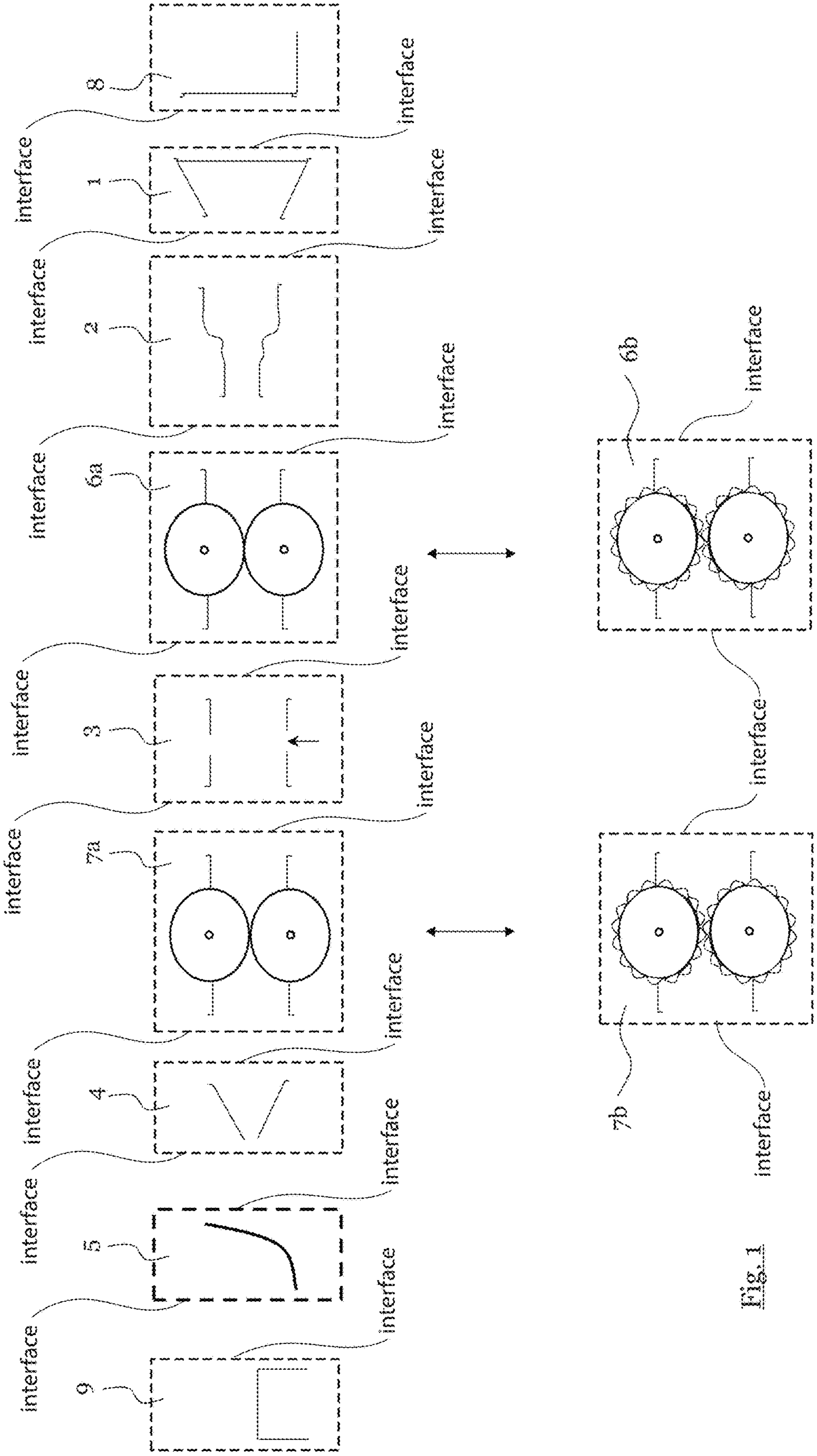

(52) U.S. Cl.
CPC ................ *B31D 2205/0058* (2013.01); *B31D 2205/0082* (2013.01)

(56) References Cited

U.S. PATENT DOCUMENTS

| | | | | |
|---|---|---|---|---|
| 6,019,715 | A * | 2/2000 | Ratzel .................. | B31D 5/0047<br>493/464 |
| 2006/0128545 | A1 | 6/2006 | Timmers et al. | |
| 2014/0106953 | A1 | 4/2014 | Deis et al. | |
| 2018/0236742 | A1 | 8/2018 | Cheich et al. | |
| 2019/0193365 | A1 | 6/2019 | Slovencik | |
| 2020/0061951 | A1 | 2/2020 | Slovencik | |

FOREIGN PATENT DOCUMENTS

| | | | |
|---|---|---|---|
| DE | 102017106547 | A1 | 9/2018 |
| DE | 102017109330 | A1 | 11/2018 |
| WO | 9701434 | A2 | 1/1997 |

OTHER PUBLICATIONS

German Examination Report dated Nov. 14, 2019, Application No. 10 2019 001 185.6.

* cited by examiner

APPARATUS FOR MANUFACTURING A PACKAGING PRODUCT, AND KIT FOR FORMING AN APPARATUS

CROSS REFERENCE TO RELATED APPLICATIONS

This patent application is a U.S. National Stage application of International Application No. PCT/EP2020/054204, filed Feb. 18, 2020, which claims priority to German Patent Application No. 10 2019 001 185.6, filed Feb. 18, 2019, each of which is incorporated herein by reference in its entirety.

BACKGROUND

Field

The disclosure relates to an apparatus for manufacturing a packaging product from a web of packaging material and to a kit for forming an apparatus for manufacturing a packaging product.

Related Art

Generic production apparatuses for packaging material are used, for example, in logistics centers to provide a tailored-to-length packaging product for cushioning an item for shipping when packaging it. Different packaging materials can be used for this purpose. The packaging material can, for example, be obtained from a paper web roll, in particular a recycled paper roll, which saves space compared to the packaging product, or from a stacked recycled paper web. By forming the web material, a desired volume and, for example by creating air pockets during forming, a desired cushioning effect can be set.

Depending on the web material used and the desired properties of the packaging product, different requirements are placed on the production apparatus. In addition to the type of packaging material, for example, the dimensions of the web material can play a role, in particular a web width or thickness. The desired shape and dimensions of the packaging product also influence the requirements on the production apparatus.

A known apparatus for providing cushioning material for use in this technical field is described in the document DE 10 2017 109 330 A1. The apparatus comprises a crumpling mechanism, a separating device and a dispensing area. In the known apparatus, a set of feeding devices is provided, via which a web-shaped starting material is aligned or formed and fed to the crumpling mechanism, for example via funnel-like guiding plates. Each of the feeding devices can be coupled to a housing of the apparatus via a coupling section. This enables modular interchangeability of feeding devices. By exchanging one feeding device for another feeding device of the set of feeding devices, the known apparatus can be adapted to a web material with a changed width or to another desired shape of the feed.

However, further adaptation of the known apparatus to different requirements and local conditions is not possible. For example, the crumpling mechanism, separating device and dispensing area are firmly connected and coordinated with each other to ensure a consistent supply of packaging material. However, it is not possible to provide other shapes or dimensions of the packaging material or to use web materials that result in different requirements for the components mentioned. Furthermore, the known apparatus cannot be used in a flexible manner in terms of location, since it is not possible to output the packaging material in a way that is adapted to the installation site and the intended place of use.

The document DE 10 2017 106 547 A1 also discloses an apparatus for providing a cushioning material. In the known apparatus, a supply device for supplying the cushioning material is connected to a data input and data output device via an interface device. Via a second interface device, the supply device can be connected to a stand or a wall mount. The data input and output device, the supply device and the stand or wall mount are modularly interchangeable and can be connected to each other via the interface devices. However, adaptation to different source material for the cushioning material, to desired properties of the cushioning material or for a site-specific output of the cushioning material is not possible with the known device.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 1 a schematic representation of a kit for forming an apparatus for manufacturing a packaging product from a web of packaging material according to an exemplary embodiment.

Figure 2:
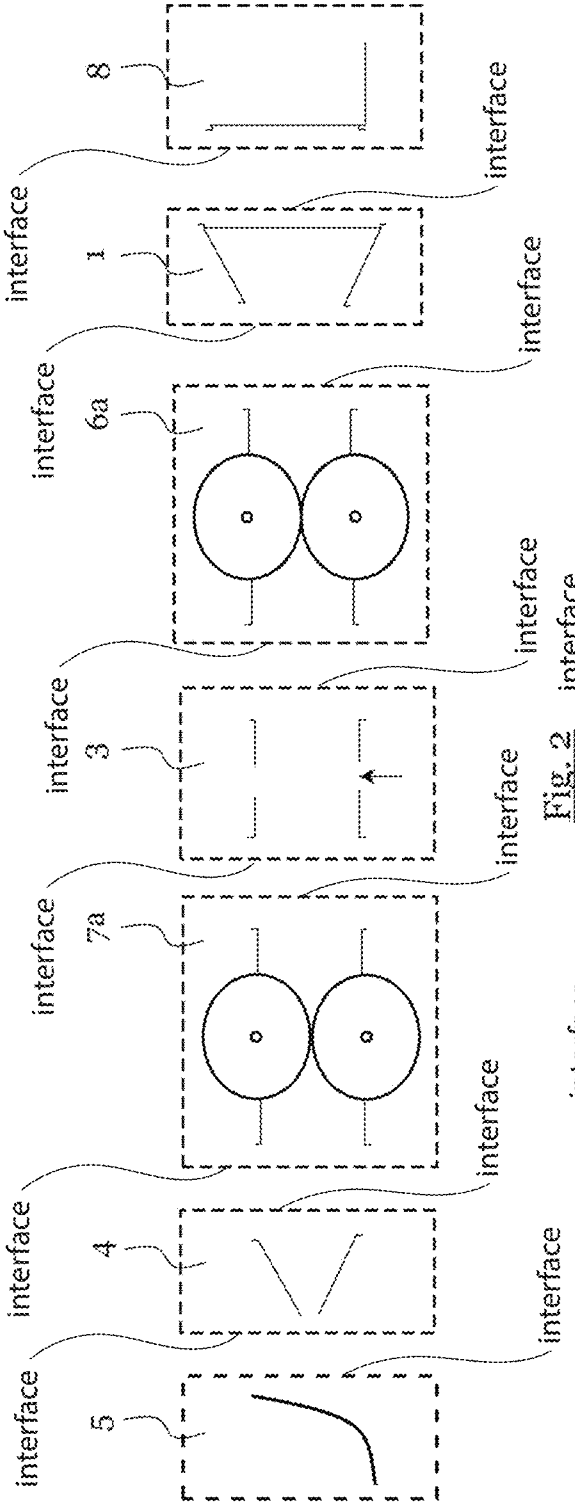

FIG. 2 a schematic representation of an apparatus for manufacturing a packaging product from a web of packaging material according to an exemplary embodiment.

Figure 3:
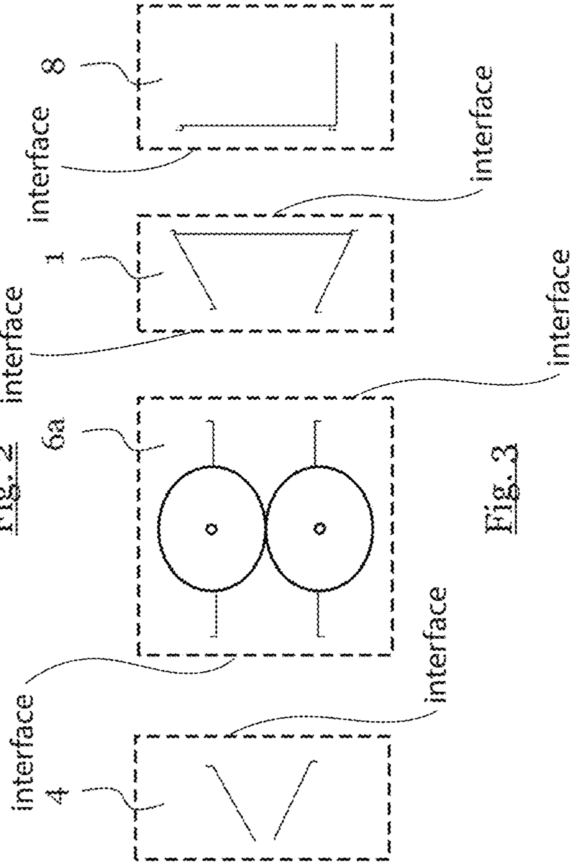

FIG. 3 a schematic representation of another apparatus for manufacturing a packaging product from a web of packaging material according to an exemplary embodiment.

Figure 4:
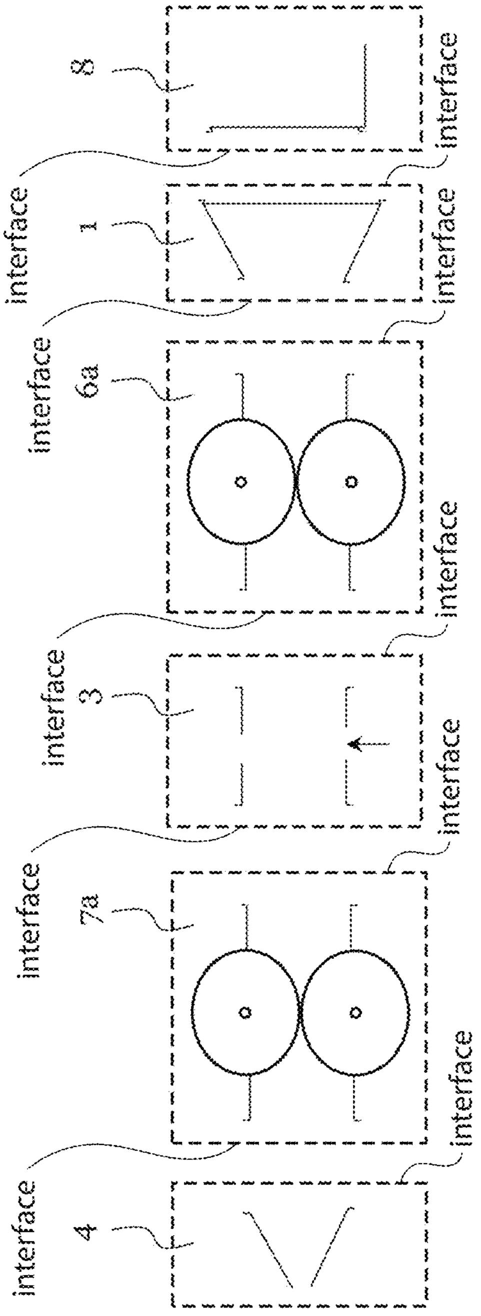

FIG. 4 a schematic representation of a further apparatus for producing a packaging product from a web of packaging material according to an exemplary embodiment.

Figure 5:
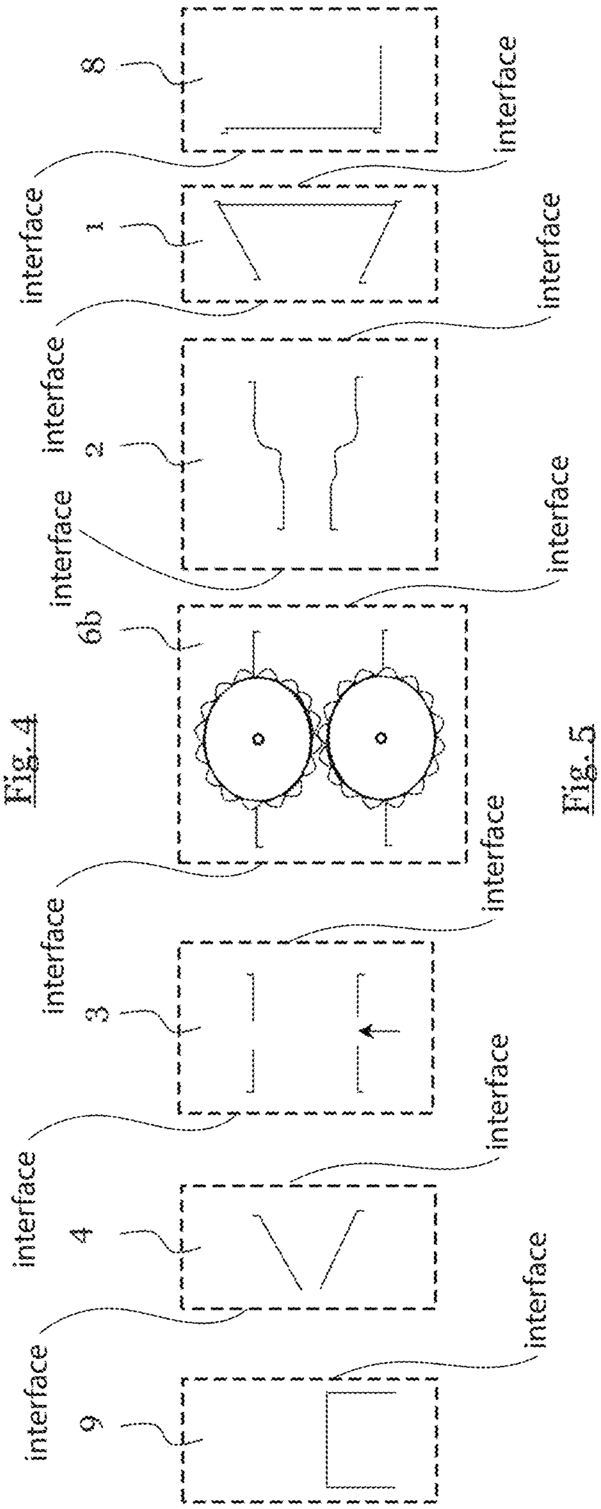

FIG. 5 a schematic representation of still another apparatus for producing a packaging product from a web of packaging material according to an exemplary embodiment.

Figure 6:
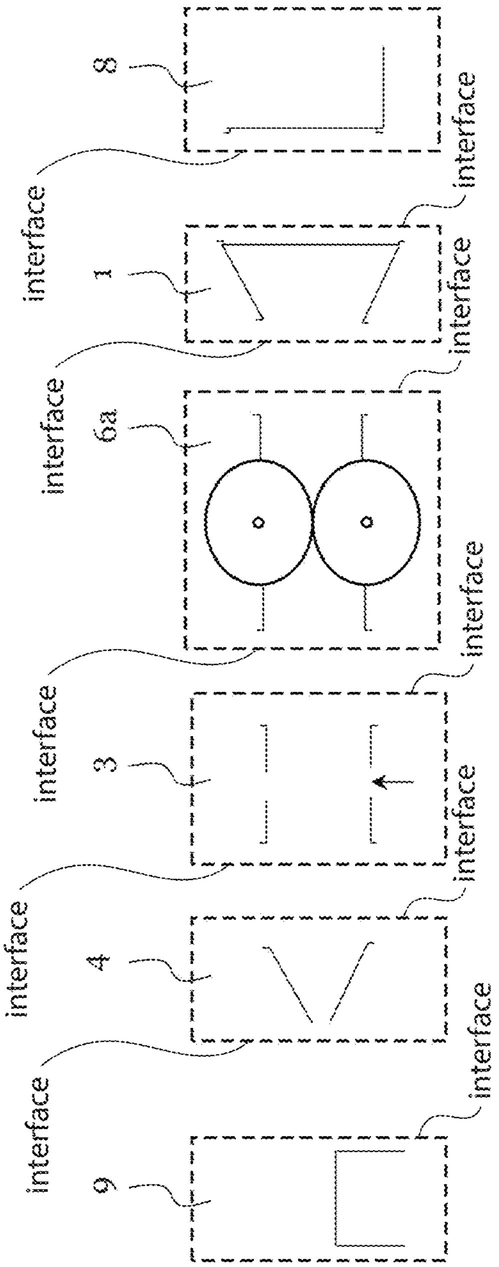

FIG. 6 a schematic representation of another apparatus for manufacturing a packaging product from a web of packaging material according to an exemplary embodiment.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

It is the object of the disclosure to provide an improved apparatus for manufacturing a packaging product from a web of packaging material, in which, in particular, flexible use at different locations and for manufacturing different packaging products as well as simple and non-destructive replacement of worn parts are possible.

According to one aspect, an apparatus is provided for manufacturing a packaging product from a web of packaging material, such as a single-layer or multi-layer paper or corrugated board web, in particular from recycled paper or recycled corrugated board. The apparatus comprises the following functional units: a feeding device for aligned feeding of the packaging material web, a tailoring device for tailoring the packaging material web, a drawing device for drawing off the packaging material web and/or a deforming device for deforming the packaging material web and/or a discharging device for removing the packaging material product from the tailoring area, a dispensing device for dispensing the packaging material product, and a module interface. Via the module interface, one of the tailoring device, the feeding device, the deforming device, the discharging device and the dispensing device can be detached and connected to a further functional unit of the group of tailoring device, feeding device, deforming device, discharge device and dispensing device, which is to be arranged upstream and/or downstream of the conveying direction, in such a way that it can be exchanged for another and/or similar functional unit.

According to the disclosure, an apparatus for manufacturing a packaging product from a packaging material is provided. In particular, the packaging material may comprise a fiber starting material. For example, the packaging material may be single or multi-ply paper, in particular recycled paper, or corrugated board, in particular recycled corrugated board.

Interchangeable functional units can form a module family. In particular, similar functional units can form a module family, whereby a similarity of a module family can result, for example, from a same superordinate function designation. With respect to other properties, the functional units of a module family may be different. For example, a module family may comprise different tailoring devices, which are each set up for tailoring a web of packaging material, the different tailoring devices being set up for converting the web of packaging material according to different parameters and/or by means of different technical apparatuses. Another family of modules may comprise different drawing devices, each of which is set up for drawing off a web of packaging material, the different drawing devices being set up for drawing off the web of packaging material according to different parameters and/or by means of different technical apparatuses. The above explanations may apply accordingly to module families of other similar functional units.

The apparatus may include a storage device, for storing the packaging material web, as a further functional unit.

The storage device can be detachable via a module interface assigned to the storage device and can be connected to a further functional unit of the functional units of the apparatus to be arranged downstream of the conveying direction in such a way that it can be exchanged for another and/or similar functional unit.

The apparatus can include a deposit device, for storing the packaging product, as a further functional unit.

The deposit device can be detachably connected to a further functional unit of the functional units of the apparatus to be arranged upstream of the conveying direction via a module interface assigned to the deposit device and can be exchanged for another and/or similar functional unit.

The apparatus can comprise a diverting device, for directing the packaging product from a functional unit to be arranged upstream in the conveying direction to a predetermined position, as a further functional unit.

The diverting device can be detachably connected via a module interface assigned to the diverting device and exchanged for another and/or similar functional unit to a further functional unit of the functional units of the apparatus to be arranged upstream and/or downstream of the conveying direction.

The apparatus can have several module interfaces, preferably at least two, three, or four module interfaces, whereby a functional unit can be detached via each of the module interfaces and can be connected to a further functional unit of the functional units of the apparatus, which is to be arranged upstream and/or downstream of the conveying direction, in such a way that it can be exchanged for another and/or similar functional unit.

Each functional unit can be detached via a respective module interface and can be connected to a further functional unit of the functional units of the apparatus to be arranged upstream and/or downstream of the conveying direction in such a way that it can be exchanged for another and/or similar functional unit.

The module interface or the module interfaces can be used to align and fasten the respective functional unit to be arranged upstream and/or downstream for connecting the respective functional unit to be arranged upstream and/or downstream.

The module interface or at least one of the module interfaces may include an electrical interface.

The module interface or at least one of the module interfaces may include a motion interface for transmitting a motion.

All module interfaces may be of uniform design and, via each module interface, each functional device may be detachably and interchangeably connectable to any other and/or similar functional unit with any other functional device of the functional devices of the device.

According to a further aspect, a kit is provided for forming an apparatus for manufacturing a packaging product from a packaging material web, such as a single-layer or multilayer paper or corrugated board web, in particular from recycled paper or recycled corrugated board. The kit comprises the following functional units: a feeding device for aligned feeding of the packaging material web, a tailoring device for tailoring the packaging material web, a drawing device for drawing off the packaging material web and/or a deforming device for deforming the packaging material web and/or a discharging device for removing the packaging material product from the tailoring area, and a discharge device for discharging the packaging material product. The kit comprises a plurality of functional units of at least one of the following families of modules of functional units: tailoring devices, feeding devices, deforming devices, conveying devices, and dispensing devices. Each of the functional units of a module family is detachable in each case via a module interface associated with the relevant functional unit for forming an apparatus for producing a packaging product and is connectable within the module family interchangeably to a further functional unit of the functional units of the kit to be arranged upstream and/or downstream of the conveying direction.

The kit may further comprise a plurality of functional units of at least one of the following families of modules: storing means for storing the packaging material web; depositing means for storing the packaging product; and diverting device for directing the packaging product from a functional unit to be disposed upstream to a predetermined position. In this case, the plurality of functional units of a module family can each be detachably connected to a further functional unit of the functional units of the kit to be arranged upstream and/or downstream via a module interface assigned to the respective functional unit for forming an apparatus for producing a packaging product, and can be interchangeable with one another.

The kit may comprise a plurality of functional units of a plurality of module families, preferably at least two, three, four or each module family. Here, each functional unit of the several functional units of a respective module family can be detachably and interchangeably connectable to a further functional unit of the functional units of the kit to be arranged upstream and/or downstream of the conveying direction via a module interface assigned to the respective functional unit for forming an apparatus for manufacturing a packaging product.

All module interfaces may be of uniform design and, via each module interface, each functional device may be detachable and interchangeable with any other and/or similar functional unit with any other functional device of the functional devices of the kit.

The explanations concerning the apparatus for manufacturing a packaging product can apply accordingly to designs of the kit for forming a device for manufacturing a packaging product. In particular, embodiments of the one or more module interfaces may apply accordingly to the kit.

FIG. 1 shows a kit for forming an apparatus for manufacturing a packaging product from a web of packaging material. The kit comprises several functional units of the apparatus for manufacturing a packaging product.

A feeding device (feeder) 1 for aligned feeding of a packaging material web is designed in the embodiment of FIG. 1 as a chute element, the side walls of which guide the packaging material web in order to ensure a suitable alignment, i.e. a transverse as well as a rotational alignment to the further functional units, of the packaging material web.

A deforming device (deformer) 2 is designed to deform the packaging material web according to a geometry of the packaging product to be produced. For this purpose, guide elements, for example guide plates, can deform the web of packaging material, for example by folding over the sides of the web. Alternatively or additionally, movable elements can be provided for deforming the packaging material web. For example, stamping elements can deform the packaging material web by applying pressure. Roller elements, which can be formed with formations, can cause folding, deformation by protrusions and/or perforation of the packaging material web.

A tailoring device (tailor) 3 for tailoring the packaging material web is designed in the shown version of the kit as a cutting device in which the packaging material web is cut to the required length in a guillotine-like manner by a translationally movable blade. Alternatively, a design with a rotating blade may be provided. For example, a permanently rotating blade can be designed such that along the circumference of the rotating blade a section with larger radius and cutting edge is formed, which cuts through the packaging material web during a time period of the rotation of the blade, while another section with smaller radius and with blunt edge is formed, so that the packaging web is moved past the blade without being cut during a time period of the blade rotation, during which the blunt blade section is facing the web.

A dispensing device (dispenser) 4 serves to dispense the packaging material product in an apparatus formed by means of the kit. In the embodiment shown, the dispensing device 4 is formed by a rear wall which closes off the apparatus and in which an opening is formed for dispensing the packaging material product. Guiding elements are arranged at the opening, which guide the packaging material product for dispensing in a desired direction.

A diverting device (diverter) 5 for guiding the packaging product to a predetermined position is formed in the shown kit as an arrangement of guiding plates adapted for guiding the packaging product from the dispenser device 4 to a place of use of the packaging product at an installation site of the apparatus.

The kit comprises a set of drawing devices (drawer, conveyor, puller) 6*a*, 6*b* for pulling the web of packaging material from a roll on which the web of packaging material is provided, by the feeding device 1 and the deforming device 2. The drawing devices 6*a*, 6*b* form a module family of drawing devices. The drawing device 6*a* is formed with a pair of smooth rollers, which are driven by means of a driving device to draw the web of packaging material, the web of packaging material passing between the rollers so as to be moved along a conveying direction via a frictional engagement thereof.

Compared to the drawing device 6*a*, the further drawing device 6*b* is formed with a pair of driven rollers which have formations. When the web of packaging material is pulled off, the rollers with formations cause a form fit between the rollers and the web of packaging material and, at the same time, a deformation of the web of packaging material. The further drawing device 6*b* thus combines the functional scope of a drawing device and a deforming device.

Furthermore, the kit of FIG. 1 comprises a set of discharging devices (discharger) 7*a*, 7*b* for removing the packaging material product from the tailoring area and to the dispensing device 4. The discharging devices 7*a*, 7*b* form a module family of discharging devices. The discharging device 7*a* is formed with a pair of smooth rollers, which are driven by means of a driving device to pull the web of packaging material, the web of packaging material passing between the rollers so as to be moved along the conveying direction via frictional engagement thereof.

Compared to the discharging device 7*a*, the further discharging device 7*b* is formed with a pair of driven rollers having formations. When the packaging material web is moved, the rollers with formations cause a form fit between the rollers and the packaging material web and, at the same time, a deformation of the packaging material web. The further discharging device 7*b* thus combines the functional scope of a discharging device and a deforming device.

The functional units of the kit each comprise at least one interface device. Here, the feeding device 1 has an interface device on a downstream side of the feeding device 1. The diverting device 5 has an interface device on an upstream side of the diverting device 5. The other functional units of the kit have an interface device both on a downstream side and on an upstream side of the respective functional unit.

By means of the interface devices, two functional units can be coupled to each other to form a module interface, whereby the coupling can be released non-destructively.

Alignment and fastening of the functional units to be coupled is possible via each module interface. For example, to form a module interface, pins of one interface device can engage in corresponding holes of another interface device and thus ensure correct alignment of the functional units to be coupled to each other. For example, for fastening the functional units to be coupled, screws of one interface device can engage in corresponding threaded holes of the further interface device. In an alternative embodiment, clamping elements, for example brackets, of one interface device can couple with corresponding receptacles of the other interface device, for example tabs, and clamp the functional units against each other.

In embodiments of the kit, one or more module interfaces may have a respective electrical interface. For example, module interfaces may have electrical plug contacts for transmitting electrical power and/or signals. Here, only some of the interface devices may have corresponding electrical devices, such as plug contacts. For example, only interface devices on such functional units may have corresponding electrical devices which require an electrical power supply or which are set up to receive or transmit electrical signals. In this case, interface devices without corresponding electrical devices are designed in such a way that a connection between interface devices with electrical devices and interface devices without electrical devices is made possible.

Alternatively or additionally, functional modules may have electrical interfaces for electrical power and/or signal transmission from and/or to external devices. For example, an external control device can be provided which exchanges electrical energy and/or signals with one or more functional units for controlling an apparatus for manufacturing a packaging product.

In embodiments, a bus system of an apparatus for manufacturing a packaging product may be provided by means of electrical interfaces.

In further embodiments of the kit, one or more module interfaces may alternatively or additionally include a motion interface for transmitting a motion. For example, module interfaces may have devices for forming a shaft-hub connection or another device for forming a motion coupling. Here, only some of the interface devices may have corresponding devices for forming a motion coupling. For example, only interface devices at such functional units may have corresponding devices for forming a motion coupling, which require a driving motion. In this case, interface devices without corresponding devices for forming a motion coupling are designed in such a way that a connection between interface devices with devices for forming a motion coupling and interface devices without devices for forming a motion coupling is enabled.

In embodiments, a functional device may comprise a drive device, for example an electric motor, and a drive movement, for example a rotation, provided by the drive device may be transmitted by means of devices for forming a movement coupling via corresponding module interfaces to functional units requiring a drive movement. For example, an electric motor can be arranged in a feeding device and a rotational movement provided by the electric motor can serve to drive the feeding device and at the same time be transmitted via module interfaces to a tailoring device and/or a discharging device for driving the relevant functional device.

In the kit, all interface devices on upstream sides of the functional units have the same design. Likewise, all interface devices on the downstream sides of the functional units are designed in the same way. This ensures that all functional units are interchangeable with one another, whereby the feeding device 1 can be arranged exclusively at an upstream end of an apparatus to be formed and the diverting device 5 can be arranged exclusively at a downstream end of an apparatus to be formed. Furthermore, such an interface design makes it possible to remove functional elements from an apparatus and/or to add functional elements to an apparatus.

By means of the kit, a modular construction of apparatuses for manufacturing a packaging product from a packaging material web can be realized, whereby functional units can be selected according to an application scenario of the respective apparatus and individual functional units can be replaced if necessary, for example due to damage or wear or for adapting the apparatus to a changed application scenario.

For example, when forming an apparatus for manufacturing a packaging product using the kit according to FIG. 1, a choice can be made between the drawing device **6*a* and the further drawing device 6*b* in order to adapt the apparatus to a desired geometry of the packaging product to be manufactured. In addition, there is the option of providing or omitting the separate deforming device 2 when using the further drawing device 6*b*** in order to achieve a desired geometry of the packaging product to be produced. The selected functional units can then be coupled by means of the interface devices via module interfaces to form an apparatus for manufacturing a packaging product.

In an exemplary embodiment, the kit further comprises a storage device 8 for storing the packaging material web and a deposit device 9 for storing the packaging product. The storage device 8 can, for example, be designed as a holder for rotatably receiving a web of packaging material rolled up on a roll. The deposit device 9 may be formed, for example, as a compartment or container into which the packaging product is directed by means of the diverting device 5. The packaging product can then be removed from the deposit device 9 for further use. The storage device 8 and/or the deposit device 9 can be freely arranged with respect to the apparatus to be formed in order to ensure the desired functionality.

In an alternative embodiment, the storage device 8 is designed with an interface device on a downstream side of the storage device 8. In such an embodiment, the feeding device 1 additionally has an interface device on an upstream side of the feeding device 1. As a further alternative or in addition, the storage device 9 may be configured with an interface device on an upstream side of the storage device 9. In such an embodiment, the diverting device 5 additionally has an interface device on a downstream side of the discharge device 5. In this way, the storage device 8 and/or the deposit device 9 can also be coupled to other functional units via modular interfaces to form an apparatus for producing a packaging product.

In further embodiments, the kit may have additional functional units, which may form different families of modules for the construction of apparatuses for manufacturing a packaging product. In such embodiments, the kit need not comprise all the functional units shown in FIG. 1.

With reference to FIGS. 2 to 6, apparatuses for manufacturing a packaging product from a web of packaging material are described below, which can be formed by means of the kit according to FIG. 1 or by means of alternative designs of a kit for forming an apparatus for manufacturing a packaging product.

FIG. 2 shows an arrangement of an apparatus for producing a packaging product from a web of packaging material, comprising a storage device 8, a feeding device 1, a drawing device 6*a*, a tailoring device 3, a discharging device 7*a*, a dispensing device 4 and a diverting device 5. In this case, in the case of the feed device 1, the drawing device 6*a*, the tailoring device 3, the discharging device 7*a*, the dispensing device 4 and the diverting device 5 adjacent functional units are coupled to one another by means of a respective modular interface. Thus, the feeding device 1, the drawing device 6*a*, the tailoring device 3, the discharging device 7*a*, the dispensing device 4 and the diverting device 5 are each arranged in the apparatus in a modularly interchangeable manner. The storage device 8 is freely arranged opposite the feeding device 1 for drawing off the web of packaging material.

FIG. 3 shows another apparatus for producing a packaging product from a web of packaging material, comprising a storage device 8, a feeding device 1, a drawing device 6*a* and a dispensing device 4. Here, in the case of the feeding device 1, the drawing device 6*a* and the dispensing device 4, adjacent functional units are coupled to one another by means of a respective modular interface. Thus, the feeding device 1, the drawing device 6*a* and the dispensing device 4 are each arranged in the apparatus in a modularly interchangeable manner. The storage device 8 is arranged freely opposite the feeding device 1 for drawing off the web of packaging material. In the apparatus according to FIG. 3, the output packaging product is to be cut to size manually outside the apparatus.

FIG. 4 shows a further apparatus for producing a packaging product from a web of packaging material, comprising a storage device 8, a feeding device 1, a drawing device 6*a*, a tailoring device 3, a discharging device 7*a* and a dispensing device 4. Here, in the case of the storage device 8, the feeding device 1, the drawing device 6*a*, the tailoring device 3, the discharging device 7*a* and the dispensing device 4, adjacent functional units are coupled to one another by means of a respective modular interface. Thus, the storage device 8, the feeding device 1, the drawing device 6*a*, the tailoring device 3, the discharging device 7*a* and the dispensing device 4 are each arranged in the apparatus in a modularly interchangeable manner. The storage device 8 is arranged freely opposite the feeding device 1 for drawing off the web of packaging material.

FIG. 5 shows an alternative apparatus for producing a packaging product from a web of packaging material, comprising a storage device 8, a feeding device 1, a deforming device 2, a drawing device 6*b*, a tailoring device 3, a dispensing device 4 and a deposit device 9. In the case of the feeding device 1, the deforming device 2, the drawing device 6*b*, the tailoring device 3 and the dispensing device 4, adjacent functional units are coupled to one another by means of a respective modular interface. Thus, the feeding device 1, the deforming device 2, the drawing device 6*b*, the tailoring device 3 and the dispensing device 4 are each arranged in the apparatus in a modularly interchangeable manner. The storage device 8 is arranged freely opposite the feeding device 1 for drawing off the web of packaging material. The deposit device 9 is arranged freely opposite the dispensing device 4 for receiving the packaging product.

FIG. 6 shows a design of an apparatus for producing a packaging product from a web of packaging material, comprising a storage device 8, a feeding device 1, a drawing device 6*a*, a tailoring device 3, a dispensing device 4 and a deposit device 9. Here, in the case of the feeding device 1, the drawing device 6*a*, the packaging device 3 and the dispensing device 4, adjacent functional units are coupled to one another by means of a respective modular interface. Thus, the feeding device 1, the drawing device 6*a*, the tailoring device 3 and the dispensing device 4 are each arranged in the device in a modularly interchangeable manner. The storage device 8 is arranged freely opposite the feeding device 1 for drawing off the web of packaging material. The deposit device 9 is arranged freely opposite the dispensing device 4 for receiving the packaging product.

The features disclosed in the foregoing description, in the figures and in the claims may be of importance individually as well as in combination for the realization of the disclosure in the various embodiments.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

REFERENCE LIST

1 feeding device (e.g. chute)
2 deforming device (e.g. guide plate(s), stamp(s), roller(s))
3 tailoring device (e.g. cutter)
4 dispensing device (e.g. dispensing opening)
5 diverting device (e.g. guide plate(s))
6*a*, 6*b* drawing device (e.g. roller(s)
7*a*, 7*b* discharging device (e.g. roller(s))
8 storage device (e.g. roller, compartment, container)
9 deposit device (e.g. roller, compartment, container)

The invention claimed is:

1. An apparatus for producing a packaging product from a packaging material web, comprising the following functional components:

a feeding chute configured to aligningly feed the packaging material web;

a cutter configured to cut the packaging material web;

a drawing roller configured to draw off the packaging material web, a deformer configured to deform the packaging material web, and/or a discharger configured to remove the packaging product from a cutting area;

a dispenser configured to dispense the packaging product; and an interface, via which one of the cutter, the drawing roller, the deformer, the discharger, and the dispenser, is detachable and exchangeable for another and/or similar functional component, and connectable to a further functional component of the cutter, the drawing roller, the deformer, the discharger, and the dispenser arranged upstream and/or downstream of a conveying direction.

2. The apparatus according to claim 1, comprising a storage configured to store the packaging material web.

3. The apparatus according to claim 2, wherein the storage is detachable and exchangeable for another and/or similar functional component, and connectable to a further functional component of the functional components of the apparatus arranged downstream of the conveying direction via an interface assigned to the storage.

4. The apparatus according to claim 1, comprising a deposit storage configured to store the packaging product.

5. The apparatus according to claim 4, wherein the deposit storage is detachably and exchangeably connectable for another and/or similar functional component to a further functional component of the functional components of the apparatus to be arranged upstream with respect to the conveyance direction via an interface assigned to the deposit storage.

6. The apparatus according to claim 1. comprising a diverting guide configured to direct the packaging product from one of the functional components arranged at an upstream location within the apparatus.

7. The apparatus according to claim 6, wherein the diverting guide is connectable detachable and exchangeable for another and/or similar functional component, and connectable to a further functional component of the functional components of the apparatus arranged upstream and/or downstream of the conveying direction via an interface assigned to the diverting guide.

8. The apparatus according to claim 1, comprising a plurality of interfaces, wherein via each of the interfaces a functional component is detachably and exchangeably connectable for another and/or similar functional component to a further functional component of the functional components of the apparatus to be arranged upstream and/or downstream of the conveying direction.

9. The apparatus according to claim 1, wherein each functional component is configured to be detachably and exchangeably connectable for another and/or similar functional component to a further functional component of the functional components of the apparatus to be arranged upstream and/or downstream of the conveying direction via a respective interface.

10. The apparatus according to claim 1, wherein the interface is configured to align and fasten the respective functional component to be arranged upstream and/or downstream.

11. The apparatus according to claim 1, wherein the interface comprises an electrical interface.

12. The apparatus according to claim 1, wherein the interface comprises a motion interface configured to transmit motion.

13. The apparatus according to claim 1, wherein each component is associated with an interface, each of the interfaces being uniformly configured such that each component is detachably and exchangeably connectable for a different and/or similar functional component connected to any further functional component of the functional components of the apparatus.

14. The apparatus according to claim 1, wherein the interface is configured to couple a respective one of the cutter, the drawing roller, the deformer, the discharger, and the dispenser, to the further functional component.

15. The apparatus according to claim 1, wherein the interface is an electrical interface configured to transmit electrical power and/or signals to an adjacent functional unit arranged upstream and/or downstream in the conveying direction.

16. The apparatus according to claim 1, wherein the interface is a motion interface configured to transmit motion to an adjacent functional unit arranged upstream and/or downstream in the conveying direction.

17. A construction kit for forming an apparatus for manufacturing a packaging product from a packaging material web, the construction kit comprising the following functional components:

a feeding chute configured to aligningly feed the packaging material web;
a cutter configured to cut the packaging material web;
a drawing roller configured to draw off the packaging material web and/or a deformer configured to deform the packaging material web and/or a discharge configured to remove the packaging product from a cutting area; and
a dispenser configured to dispense the packaging product;
wherein the kit comprises a plurality of additional functional components of at least one of the following types of functional components:
cutters,
drawing rollers,
deformers
dischargers, and
dispensers;
and wherein each of the functional components of a functional component type detachable and interchangeable within the functional component type, and connectable to a further functional component of the functional components of the kit arranged upstream and/or downstream of the conveying direction each via an interface respectively assigned to each of the functional components of the functional component type, to form an apparatus for producing the packaging product.

18. The kit according to claim 17, further comprising a plurality of functional components from at least one of the following additional functional component types:

storage devices configured to store the packaging material web,
deposit storage configured to store the packaging product; and
diverter configured to direct the packaging product from a functional component to be arranged upstream in the conveying direction to a predetermined position,
wherein the plurality of functional components of a functional component type are detachably and interchangeably connectable to a further functional component of the functional components of the kit, to be arranged upstream and/or downstream of the conveying direction, via an interface assigned to the respective functional component for forming an apparatus for producing a packaging product.

19. The kit according to claim 17, further comprising a plurality of functional components of a plurality of additional functional component types, wherein each functional component of the plurality of functional components of a respective functional component type of the additional functional component types are detachable and interchangeable for another functional component, and connectable to a further functional component of the functional components of the kit to he arranged upstream and/or downstream of the conveying direction via an interface respectively assigned to each of the functional components of the functional component type to form the forming an apparatus for producing the packaging product.

20. The kit according to claim 17, wherein all of the respective interfaces are uniformly configured and, via each of the respective interfaces, each of the functional components is detachable and exchangeable for another and/or similar functional component, and connectable to any further functional component of the functional components of the kit.

* * * * *